United States Patent
Glos

(10) Patent No.: US 6,972,600 B2
(45) Date of Patent: Dec. 6, 2005

(54) BASE ELEMENT FOR A MULTIPLEXER STRUCTURE AND CORRESPONDING MULTIPLEXER STRUCTURE

(75) Inventor: Thomas Glos, Düsseldorf (DE)

(73) Assignee: Infineon Technologies AG, Munich (DE)

( * ) Notice: Subject to any disclaimer, the term of this patent is extended or adjusted under 35 U.S.C. 154(b) by 237 days.

(21) Appl. No.: 10/344,549
(22) PCT Filed: Aug. 22, 2001
(86) PCT No.: PCT/EP01/09706
§ 371 (c)(1), (2), (4) Date: Jul. 11, 2003
(87) PCT Pub. No.: WO02/19618
PCT Pub. Date: Mar. 7, 2002

(65) Prior Publication Data
US 2004/0017832 A1 Jan. 29, 2004

(30) Foreign Application Priority Data
Aug. 29, 2000 (DE) .................................. 100 42 380

(51) Int. Cl.⁷ ............................................. H03K 19/20
(52) U.S. Cl. .................... 326/104; 326/105; 307/407
(58) Field of Search .................................. 326/104, 105; 327/407; 370/532, 537

(56) References Cited

U.S. PATENT DOCUMENTS

| | | | |
|---|---|---|---|
| 4,542,496 A | | 9/1985 | Takeyama et al. |
| 4,593,390 A | * | 6/1986 | Hildebrand et al. ........ 370/541 |
| 5,127,067 A | | 6/1992 | Delcoco et al. |
| 5,155,387 A | | 10/1992 | Fletcher et al. |
| 5,686,856 A | * | 11/1997 | Piguet et al. ............... 327/407 |
| 5,712,806 A | * | 1/1998 | Hennenhoefer et al. ...... 716/16 |
| 5,761,208 A | | 6/1998 | Muramatsu |
| 6,480,054 B2 | * | 11/2002 | Tran et al. .................. 327/408 |

FOREIGN PATENT DOCUMENTS

| | | |
|---|---|---|
| DE | 199 11 954 A1 | 9/2000 |
| EP | 0 087 153 A1 | 2/1983 |
| WO | WO 00-55737 A2 | 9/2000 |

* cited by examiner

Primary Examiner—Vibol Tan
(74) Attorney, Agent, or Firm—Jagtiani + Guttag

(57) ABSTRACT

A divided multiplexer structure which can be used to replace a tristate bus, comprising node elements which are embodied in such a way that no feedback can occur in between the interconnected nodes. For this purpose, each node includes at least one feedback-free connection port.

11 Claims, 2 Drawing Sheets

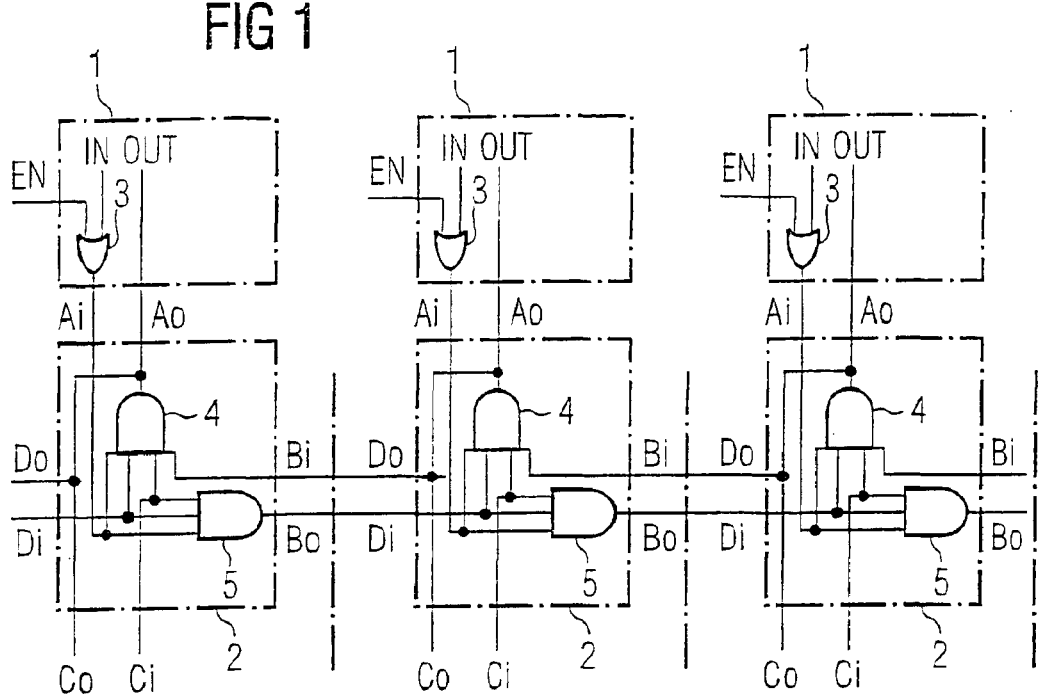
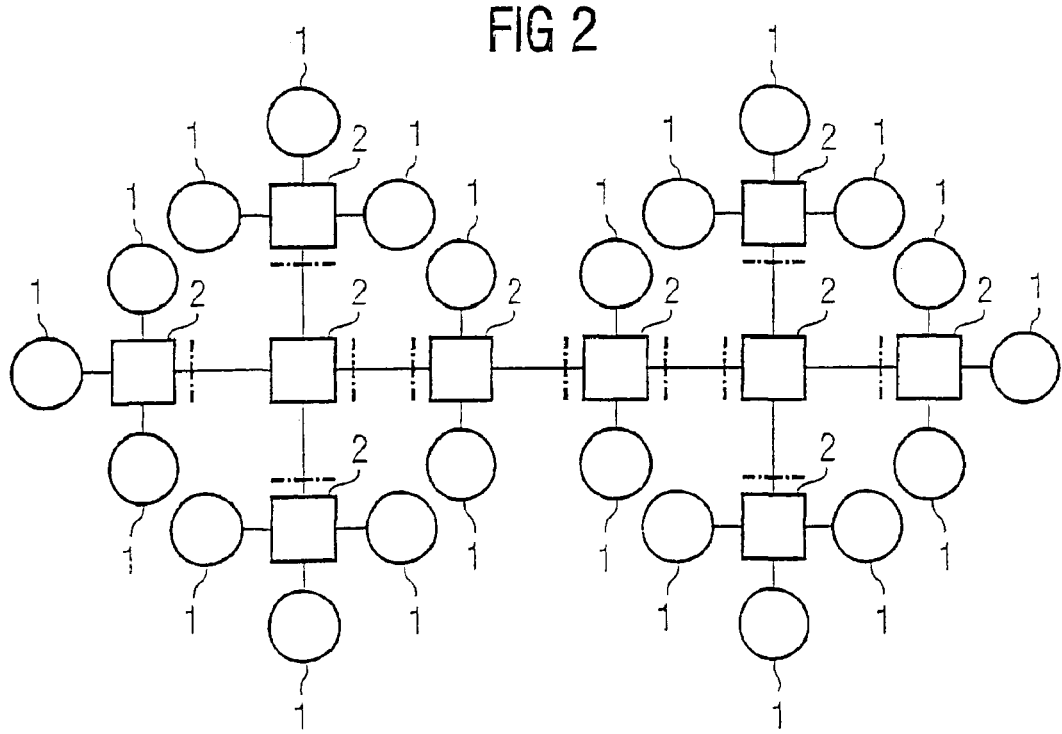

(STATE OF THE ART)

BASE ELEMENT FOR A MULTIPLEXER STRUCTURE AND CORRESPONDING MULTIPLEXER STRUCTURE

This application is a 371 of PCT/EP01/09706 filed Aug. 22, 2001.

BACKGROUND OF THE INVENTION

1. Field of the Invention

The present invention relates generally to a base element and, more particularly, to a base element, which can be used for constructing a multiplexer structure.

2. Related Art

A tristate bus is preferably used wherever data is exchanged between different periphery or data transmission and receiving units. Possible areas of application are thus, for example, computer or chip technology etc.

In many designs, the tristate bus is replaced by a cascaded multiplexer structure, in which all bus or data signals of the coupled data transmission and data receiving units must flow via the last stage of the cascade. A corresponding example is illustrated in FIG. 4. As shown by FIG. 4, several data transmission and data receiving units 1 designated below as "modules" for the sake of simplicity are interconnected in a cascade through logic OR gates 7. Each module 1 has a data input IN, via which a corresponding module-specific data signal can be supplied to the tristate bus or multiplexer structure. For this purpose, a logic AND gate 6 is illustrated in FIG. 4 for each module 1, to which on the one hand the data input signal IN and on the other hand an enabling signal EN are supplied, whereby the interconnection or output of the corresponding data signal IN can be controlled by means of the enabling signal EN. All data signals of the connected modules 1 must flow via the last stage of the illustrated cascade. This last stage then distributes all input signals IN of the multiplexer structure back to the inputs of the driving modules 1. A disadvantage associated with this cascaded multiplexer structure is due to the fact that all input signals IN must converge at a central point in the circuit layout and be routed back from there to all coupled modules 1 via-buffer 8, which results in unfavourable load distribution. Thereby, a high unit density ("routing congestion") occurs at this central point in the circuit layout as well as the need for the buffers 8 shown in FIG. 4, which together form a so-called "buffer tree".

The underlying object of the present invention is to create a base element for an alternative multiplexer structure and a multiplexer structure comprising several such base elements, which can be used to replace a tristate bus, and avoids the disadvantages associated with the use of a cascaded multiplexer structure, in particular unfavourable load distribution within the circuit.

SUMMARY OF THE INVENTION

In one aspect of the invention, a base element for a multiplexer structure, with several connection points comprising a signal input and a signal output, and with signal distribution means, which communicate with the individual signal inputs and signal outputs, in order to pass on a signal at a signal input of a connection point to at least one of the signal outputs is disclosed. The signal distribution means are embodied in such a way that for at least one particular connection point they prevent a signal at the signal input of this particular connection point being passed on to the signal output of the same particular connection point and for at least another connection point they pass on a signal at the signal input of this other connection point to the signal output of the same other connection point. The signal distribution means are further embodied in such a way that they pass on the signal at the signal input of the particular connection to the signal outputs of all other connection points and a signal at a signal input of another connection point to the signal output of the particular connection point.

In another aspect of the invention, a multiplexer structure, with several base elements and several transmission/receiving units coupled to the base elements for the exchange of data between one another via the base elements is disclosed. Each base element has several connection points in each case with a data input and a data output, wherein each base element further comprises data distribution means communicating with the individual data inputs and data outputs to pass on a data signal at a data input of a connection point to at least one of the data outputs. The data distribution means prevent, for at least one particular connection point, a data signal at the data input of this particular connection point being passed on to the data output of the same particular connection point and that for at least another connection point they pass on a signal at the signal input of this other connection point to the signal output of the same other connection point.

Various embodiments of the present invention provide certain advantages and overcome certain drawbacks of the above and other conventional techniques. Not all embodiments of the present invention share the same advantages and those that do may not share them under the same or similar circumstances. Further features and advantages of the present invention as well as the structure and operation of various embodiments of the present invention are described in detail below with reference to the accompanying drawings.

BRIEF DESCRIPTION OF THE DRAWINGS

The present invention is pointed out with particularity in the appended claims. The above and further features and advantages of this invention may be better understood by referring to the following description when taken in conjunction with the accompanying drawings, in which:

FIG. 1 shows the structure and interconnection of base or node elements in accordance with one exemplary embodiment of the present invention;

FIG. 2 shows a divided multiplexer structure composed of several node elements illustrated in FIG. 1 as replacement for a tristate bus in accordance with one exemplary embodiment of the present invention;

DETAILED DESCRIPTION

The present invention is directed to a base or node element which can be used to construct a divided multiplexer structure. One embodiment of the base element includes several connection points comprising a signal input and a signal output. At the same time, the base element is embodied in such a way that at least one of these connection points or ports is feedback-free and at least one other of these connection points has feedback, so that a further base or node element can be coupled to this connection point. This can be realized by suitable logic circuits, which ensure that at least one connection point is feedback-free and at least one other connection point has feedback.

By means of such base or node elements, chains of similarly constructed nodes can be formed, to which again several data input and data output units or modules can be coupled. The individual node elements are preferably embodied in such a way that each node output always drives the same number of data inputs, which results in very favourable load distribution. Additional advantages include favourable electrical features (smaller drivers, no short-term overloading due to overlapping), simple handling (homogeneously-constructed elements, timing verification with standard methods) and favourable layout behaviour (regular unit density). At the same time, those connection points which do not need to be feedback-free can be designed with feedback, whereby the cost of the base element is reduced.

In certain embodiments two base elements are interconnected in the multiplexer structure so that each base element is coupled to the other base element via a connection point without feedback. In this way, two connection points without feedback always lie between two base elements. This prevents feedback being formed over several base elements, which could occur under certain circumstances when only one feedback-free input were to lie in between two interconnected base elements.

The present invention is, in particular, suitable for chip packages with an on-chip tristate bus. Naturally, the present invention is, however, also suitable for any other scope of application, where a multiplexer structure with several data transmission and data receiving units ("modules") could be used to replace a tristate bus.

Before dealing in greater detail with the exemplary embodiments of the invention, a node structure which forms the basis of the present invention, but having unwanted feedback at a connection point between two nodes, will be described with reference to FIG. 3.

Figure 3:
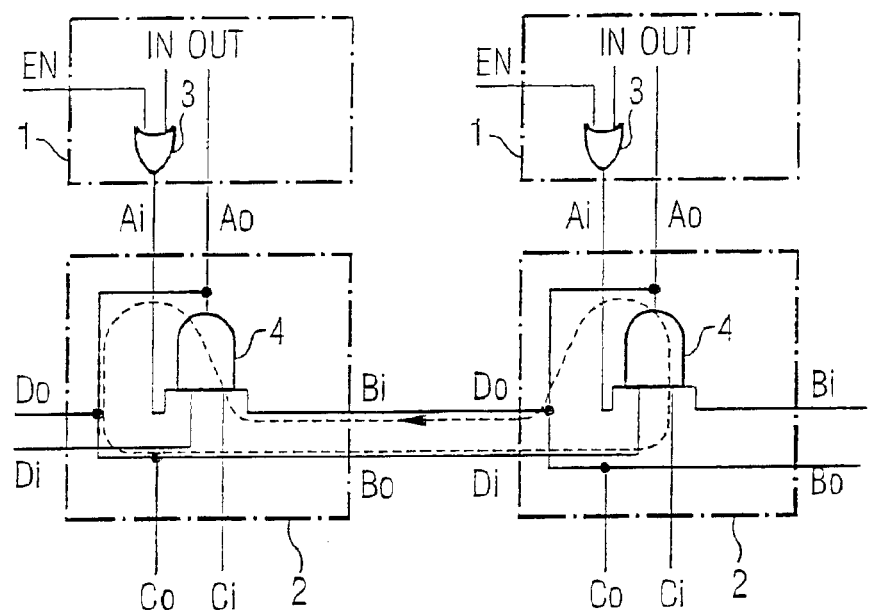
FIG. 3 shows the structure and interconnection of node elements with feedback.
Figure 4:
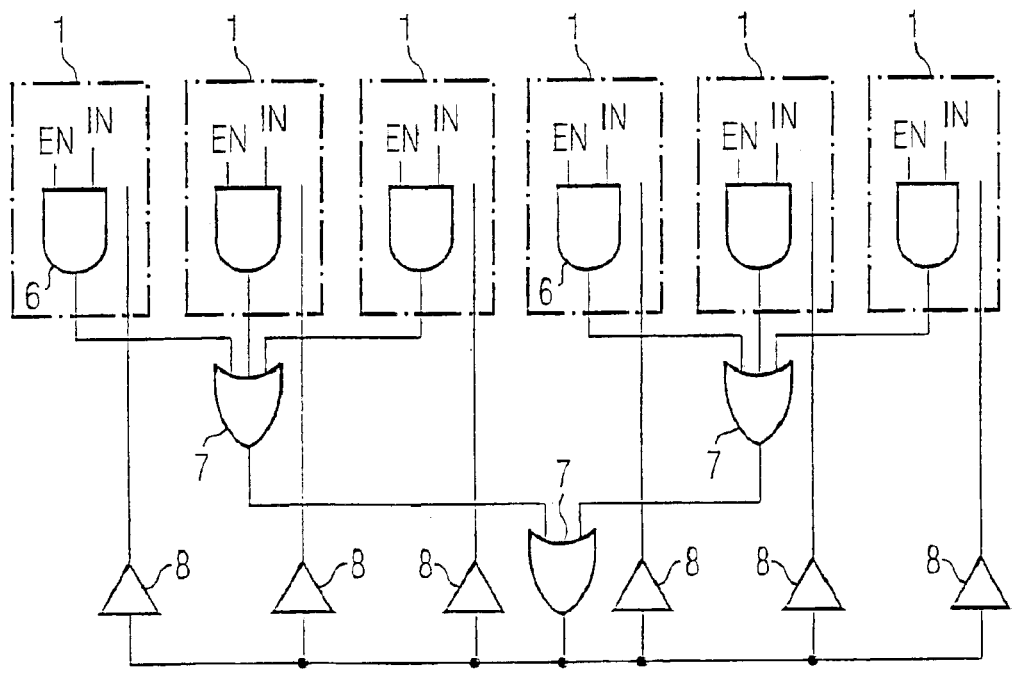
FIG. 4 shows a cascaded multiplexer structure according to prior art.

As shown by FIG. 3, each node or base element 2 has four connection points or connection ports in each case with a signal input Ai, Bi, Ci, Di and a signal output Ao, Bo, Co, Do. Modules 1 in each case can be coupled to the individual connection ports, in the case of which essentially data transmission and data receiving units are concerned, which exchange data between one another via the node or multiplexer structure illustrated. The nodes 2 are embodied in such a way that a signal, which is received at a connection port is passed onto the data outputs of all four connection ports. A simple structure of a node 2 can be realized by a quadruple OR gate. With the example shown in FIG. 3, however, a node 2 with a quadruple AND gate is realized, whereby the connected modules 1 in a state of rest drive logic "1" to the bus. This is achieved due to the fact that each module 1 has a logic OR gate, to which on the one hand the corresponding data input signal IN and an enabling signal EN is supplied, whereby the enabling signal EN in each case is active on a low level. Only the module 1 active in each case can also transmit a logic "0" to the bus.

As shown by FIG. 3, where nodes 2 constructed in this way are coupled, a feedback loop illustrated with a dotted line in FIG. 3 results, which is wanted at those connection ports, to which modules 1 are coupled, in order to transmit the data input signal at a connection port to a module 1 coupled to another connection port in the form of a data output signal. The disadvantage of the node structure shown in FIG. 3, however, is that two nodes 2 cannot be interconnected due to this feedback, since the resulting bus does not function through the logic loop formed in this way, as also evident from the illustration of FIG. 3 concerning the connection ports Bi, Bo of the left node 2 and the connection ports Do, Di of the right node 2.

In FIG. 1, several interconnected nodes 2 according to one aspect of the present invention are illustrated, whereby the problem described above is solved in such a way that each node 2 possesses a feedback-free connection port, to which a further node 2 can be coupled. Hereby, it is possible to construct a network of nodes 2. In regard to the interconnection of the nodes 2 to a divided bus or divided multiplexer structure, it must be ensured that in each case at least one feedback-free connection port always lies between two adjacent nodes 2 and the modules 1 are coupled to connection ports with feedback. In FIG. 1, the feedback-free connection ports of the nodes 2 in each case are shown with a broken line and in each case include the signal input Bi and the signal output Bo. All other connection ports Ai, Ao, Ci, Co and Di, Do comprise a feedback.

With the embodiment illustrated in FIG. 1, the connection ports Bi, Bo are feedback-free due to the fact that a quadruple AND gate 4 is proposed, to which the input signals of all connection ports are supplied, whereby the output signal of this quadruple AND gate 4 is only passed onto the signal outputs Ao, Co, Do—not however to the signal output Bo. In addition, a logic triple AND gate 5 is proposed, the inputs of which are coupled to the signal inputs Ai, Ci, Di of the connection ports with feedback, whereby the output signal of this logic triple AND gate 5 drives the signal output Bo of the connection port without feedback. In this way, it is ensured that no feedback occurs at the connection point between two adjacent nodes 2, i.e. between the connection ports Bi, Bo of the one node and the connection ports Do, Di of the other node.

As in the case for the structure illustrated in FIG. 3 also in regard to the embodiment according to the invention illustrated in FIG. 1, the internal structure of the nodes 2 is realized by logic AND gates 4, 5, so that the connected modules 1 in a state of rest must transmit logic "1" to the bus. This is again realized by means of a logic OR gate 3, which apart from the respective data input signal IN receives an enabling signal EN, that is active on a low level. In each case, only the active module 1 can also transmit a logic "0" to the bus. It should be understood that an equivalent circuit, in which the logic nodes 2 are constructed with logic OR gates, can be realized. Likewise, one of ordinary skill in the art would appreciate that nodes 2 with more or fewer connection ports are also conceivable, whereby however it must always be ensured that at least one connection port is feedback-tree.

As mentioned above, a multiplexer structure with distributed load ("divided multiplexer structure") can be formed by means of the nodes 2 embodied according to the invention, whereby the disadvantages described above are void, since chains can be realized from similarly constructed nodes 2, whereby each node output always drives the same number of inputs. In regard to the present embodiment, each node 2 possesses four connection ports in each case with a data input and a data output, to which either further nodes 2 or modules 1 can be coupled. Since the operating time between the modules 1 depends on the number of nodes 2 connected in series, a correspondingly favourable node topology should be selected.

FIG. 2 shows an example of such a favourable node topology, which can be used to construct a divided multiplexer structure. The connection ports of the nodes 2, which are feedback-free, are again shown with a broken line in each case.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. A base element for a multiplexer structure, with several connection points comprising a signal input and a signal output, and with signal distribution means, which communicate with the individual signal inputs and signal outputs, in order to pass on a signal at a signal input of a connection point to at least one of the signal outputs, wherein the signal distribution means are embodied in such a way that for at least one particular connection point they prevent a signal at the signal input of this particular connection point being passed on to the signal output of the same particular connection point and for at least another connection point they pass on a signal at the signal input of this other connection point to the signal output of the same other connection point and wherein the signal distribution means are embodied in such a way that they pass on the signal at the signal input of the particular connection to the signal outputs of all other connection points and a signal at a signal input of another connection point to the signal output of the particular connection point.

2. The base element according to claim 1, wherein the base element has four connection points in each case with a signal input and a signal output.

3. The base element according to claim 1, wherein the signal distribution means includes a first logic circuit which connects the signal inputs of all connection points with the signal outputs of those connection points, which do not correspond to the particular connection point.

4. The base element according to claim 3, wherein the first logic circuit is a logic AND circuit or a logic OR circuit.

5. The base element according to claim 1, wherein the signal distribution means comprises a second logic circuit that connects the signal inputs of those connection points, which do not correspond to the particular connection point, with the signal output of the particular connection point.

6. The base element according to claim 5, wherein the second logic circuit is a logic AND circuit or a logic OR circuit.

7. A multiplexer structure, with several base elements and several transmission/receiving units coupled to the base elements for the exchange of data between one another via the base elements, wherein each base element has several connection points in each case with a data input and a data output, wherein each base element further comprises data distribution means communicating with the individual data inputs and data outputs to pass on a data signal at a data input of a connection point to at least one of the data outputs, and wherein the data distribution means prevent, for at least one particular connection point, a data signal at the data input of this particular connection point being passed on to the data output of the same particular connection point and that for at least another connection point they pass on a signal at the signal input of this other connection point to the signal output of the same other connection point.

8. The multiplexer structure according to claim 7, wherein the base elements each have several connection points comprising a signal input and a signal output, and with signal distribution means, which communicate with the individual signal inputs and signal outputs, in order to pass on a signal at a signal input of a connection point to at least one of the signal outputs, whereby the signal distribution means are embodied in such a way that for at least one particular connection point they prevent a signal at the signal input of this particular connection point being passed on to the signal output of the same particular connection point and for at least another connection point they pass on a signal at the signal input of this other connection point to the signal output of the same other connection point and whereby the signal distribution means are embodied in such a way that they pass on the signal at the signal input of the particular connection to the signal outputs of all other connection points and a signal at a signal input of another connection point to the signal output of the particular connection point.

9. The multiplexer structure according to claim 7, wherein in each case two base elements are interconnected via at least one particular connection point.

10. The multiplexer structure according to claim 7, wherein a transmission/receiving unit in each case is coupled to a connection point of a base element, which does not correspond to the particular connection point.

11. The multiplexer structure according to claim 7, wherein two connected base elements are coupled with one another by means of a connection point in each case, for which the data distribution means prevent a data signal at the data input of this connection point being passed on to the data output of this connection point.

* * * * *